United States Patent [19]

Turner

[11] 4,103,899
[45] Aug. 1, 1978

[54] ROTARY SEAL WITH PRESSURIZED AIR DIRECTED AT FLUID APPROACHING THE SEAL

[75] Inventor: Albert Harold Turner, East Hampton, Conn.

[73] Assignee: United Technologies Corporation, Hartford, Conn.

[21] Appl. No.: 709,463

[22] Filed: Jul. 28, 1976

Related U.S. Application Data

[63] Continuation of Ser. No. 618,541, Oct. 1, 1975, abandoned.

[51] Int. Cl.² .............. F16J 15/40; F16J 15/44
[52] U.S. Cl. ............................ 277/1; 277/3; 277/53; 277/134; 432/115; 415/110; 415/175
[58] Field of Search ............ 277/1, 3, 15, 53–57, 277/74, 67–69, 72 R, 72 FM, 135, 133, 134; 432/115; 415/110–113, 115, 116, 172 R, 175; 34/242

[56] References Cited

U.S. PATENT DOCUMENTS

| 853,059 | 5/1907 | Bunge | 277/57 |
|---|---|---|---|
| 2,123,818 | 7/1938 | Wegmann | 277/55 |
| 2,199,250 | 4/1940 | Stroebel | 277/54 X |
| 2,448,717 | 9/1948 | Jeffcock | 415/112 X |
| 2,463,898 | 3/1949 | Moore | 415/175 X |
| 2,545,916 | 3/1951 | Clark | 277/53 |
| 2,598,176 | 5/1952 | Johnstone | 415/113 X |
| 2,685,429 | 8/1954 | Auyer | 415/112 X |
| 2,988,325 | 6/1961 | Dawson | 415/115 X |
| 3,239,193 | 3/1966 | Kerensky | 415/110 |
| 3,514,112 | 5/1970 | Pettengill | 277/53 X |
| 3,527,053 | 9/1970 | Horn | 415/174 X |
| 3,558,238 | 1/1971 | Van Herpt | 277/56 X |
| 3,768,921 | 10/1973 | Brown et al. | 415/116 |
| 3,836,156 | 9/1974 | Dunthorne | 277/53 |
| 3,989,410 | 11/1976 | Ferrari | 415/116 X |

FOREIGN PATENT DOCUMENTS

| 1,338,213 | 8/1963 | France | 415/113 |
|---|---|---|---|
| 964,737 | 5/1957 | Fed. Rep. of Germany | 277/53 |
| 423,925 | 7/1947 | Italy | 415/112 |
| 29,931 | 7/1966 | Japan | 415/110 |
| 324,426 | 1/1930 | United Kingdom | 277/57 |
| 820,708 | 9/1959 | United Kingdom | 277/53 |
| 822,170 | 10/1959 | United Kingdom | 415/110 |
| 1,242,246 | 8/1971 | United Kingdom | 277/134 |
| 120,103 | 10/1959 | U.S.S.R. | 277/53 |

*Primary Examiner*—Robert S. Ward, Jr.
*Attorney, Agent, or Firm*—Robert C. Walker

[57] ABSTRACT

A seal design which is particularly suited for use between the rotating and stationary components of a machine is disclosed. Various construction details which increase the resistance to the flow of a fluid medium across the seal from a region of higher pressure to a region of lower pressure are developed. The seal design is built around conventional rotary seals, such as labyrinth or wide channel seals, and includes means for aerodynamically impeding the flow of the fluid medium approaching the upstream end of the seal.

12 Claims, 3 Drawing Figures

ROTARY SEAL WITH PRESSURIZED AIR DIRECTED AT FLUID APPROACHING THE SEAL

This is a continuation, of application Ser. No. 618,541, filed Oct. 1, 1975, now abandoned.

BACKGROUND OF THE INVENTION

1. Field of the Invention

This invention relates to rotary machines, and more particularly to rotary seals between the rotating and stationary components of the machine.

2. Description of the Prior Art

Rotary seals such as a labyrinth seal are typically utilized with rotating machinery to impede the leakage of a medium between rotating and stationary components from a high pressure region to a low pressure region. A labyrinth seal is formed of a sealing surface on one component and a restrictive ring on the other component which projects into close proximity with the sealing surface. A plurality of restrictive rings are commonly disposed in series to form alternating flow throttling and expanding regions along the labyrinth seal to reduce the pressure of the leakage medium through the dissipation of kinetic energy.

In gas turbine engines labyrinth seals are typically used to prevent the excessive leakage of air into the bearing compartments and to prevent the excessive leakage of air externally of the working medium flow path from one engine stage to another. One construction for sealing between adjacent stages in the turbine section of an engine is shown in U.S. Pat. No. 3,514,112 to Pettengill entitled "Reduced Clearance Seal Construction". A plurality of restrictive rings in Pettengill project toward corresponding sealing surfaces. A throttle aperture is formed between each ring and its corresponding sealing surface. An expansion chamber is formed between each pair of adjacent rings. Air leakage through the first throttle aperture flows through the downstream chambers and apertures to establish a stable pressure differential across the labyrinth.

In U.S. Pat. No. 3,572,728 to Smuland entitled "Rotary Seal", means disposed immediately downstream of the restrictive ring reverses leakage fluid back upstream toward the throttle aperture to decrease the apparent pressure differential across the aperture. The Smuland seal is effective in constructions having a small clearance between the restrictive ring and the sealing surface. Under large clearance conditions the leakage fluid tends to stagnate in the reversing region and the functional ability of the means becomes reduced.

In gas turbine engines diverse thermal environments frequently necessitate substantial initial clearance between rotating and stationary components to prevent destructive interference under transient conditions. Continuing efforts are underway to discover and develop sealing means between rotating and stationary components which are effective over varied clearance ranges.

SUMMARY OF THE INVENTION

A primary object of the present invention is to reduce the leakage of fluid medium between relatively rotating components of a machine from a region of higher pressure to a region of lower pressure. A further object is to maintain reduced leakage over a wide range of clearances between the relatively rotating components. Yet another object is to establish an aerodynamic barrier to the flow of fluid medium between the components.

According to the present invention high pressure air is discharged from a nozzle immediately upstream of a rotary seal between two relatively rotating components of a machine to form an aerodynamic barrier to the flow of a fluid medium across the seal.

A primary feature of the present invention is the nozzle which is operatively positioned at the upstream end of a rotary seal. The nozzle is oriented so as to discharge the high pressure air flowing therethrough in opposition to fluid flow approaching the rotary seal. In one embodiment the air forming the barrier is discharged into a narrow channel extending between the relatively rotating components at a position immediately upstream of the rotary seal. In another embodiment the air is directed perpendicularly to the fluid flow approaching the first throttle aperture of a labyrinth seal.

A primary advantage of the present invention is the reduced leakage of fluid medium between relatively rotating components of a machine from a higher pressure region to a lower pressure region. In one gas turbine engine embodiment cooling air flowed to the region to protect the local components from thermal degradation is further utilized to form the aerodynamic barrier.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
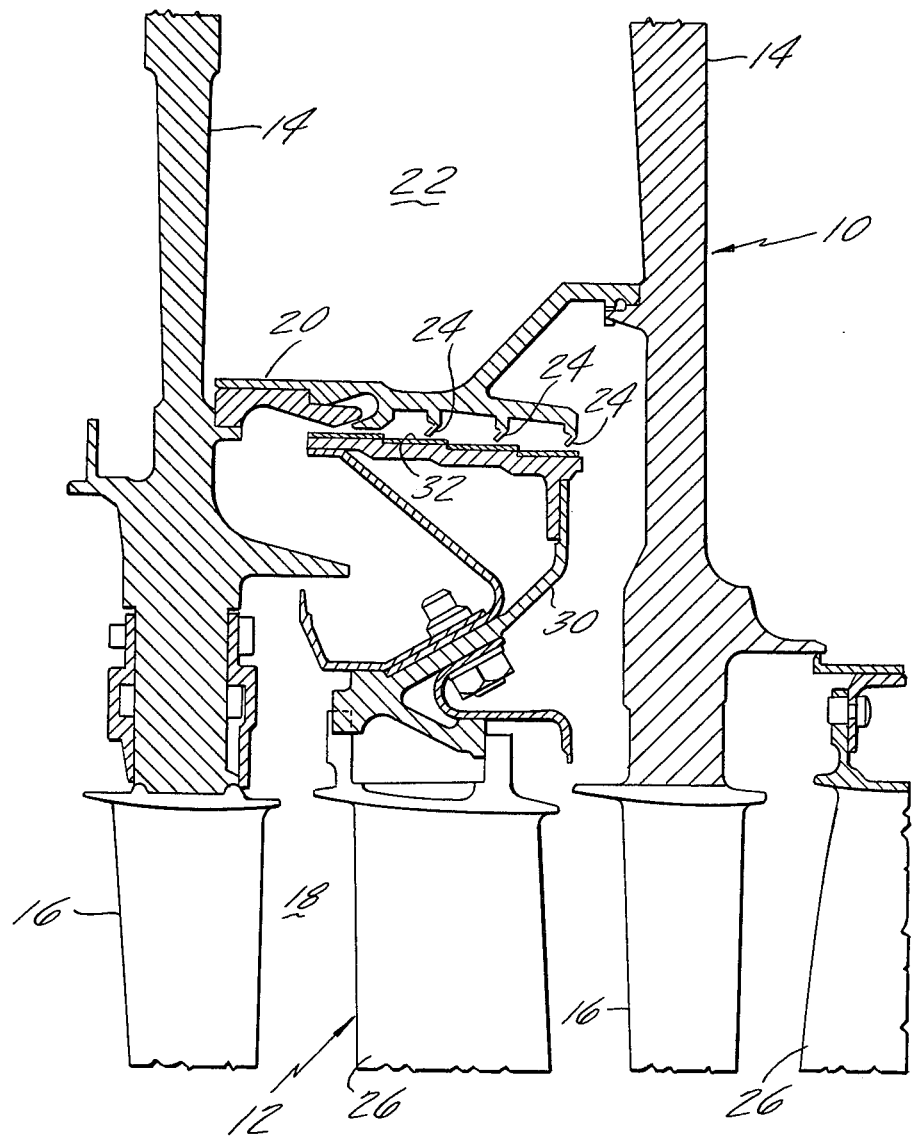
FIG. 1 is a partial cross section view of a gas turbine engine showing a rotary seal between rotating and stationary components of the turbine section.

A gas turbine engine is typical of machines which require rotary seals, such as a labyrinth seal, between relatively rotating components to inhibit the leakage of a fluid medium between the components. A portion of the turbine section of such an engine is shown in FIG. 1. Within the turbine section is a rotating or rotor assembly 10 and a stationary or stator assembly 12. The rotor assembly includes a plurality of disks 14 each of which supports a row of rotor blades 16. The blades extend radially from the disk into the flow path 18 for the working medium gases in the turbine section. A spacer 20 extends axially between each adjacent pair of disks to form a cavity 22 internally of the flow path 18. Relatively low temperature air is flowable to the cavity 22 for turbine cooling. The spacer 20 has at least one circumferentially extending, restrictive ring 24 which projects radially outward toward the flow path 18. The stator assembly 12 has a case which radially encloses the rotor assembly 10. Projecting radially inward from the case is a row of stator vanes 26. The row of vanes is disposed between two adjacent rows of rotor blades to direct the working medium gases flowing thereacross to a preferred angle within the flow path 18. The radially inner end of each vane is joined to a shroud 30. A sealing surface 32 of the shroud 30 faces radially inward to oppose the restrictive rings 24 of the rotor assembly. The surface 32 is stepped in the embodiment shown.

Figure 2:
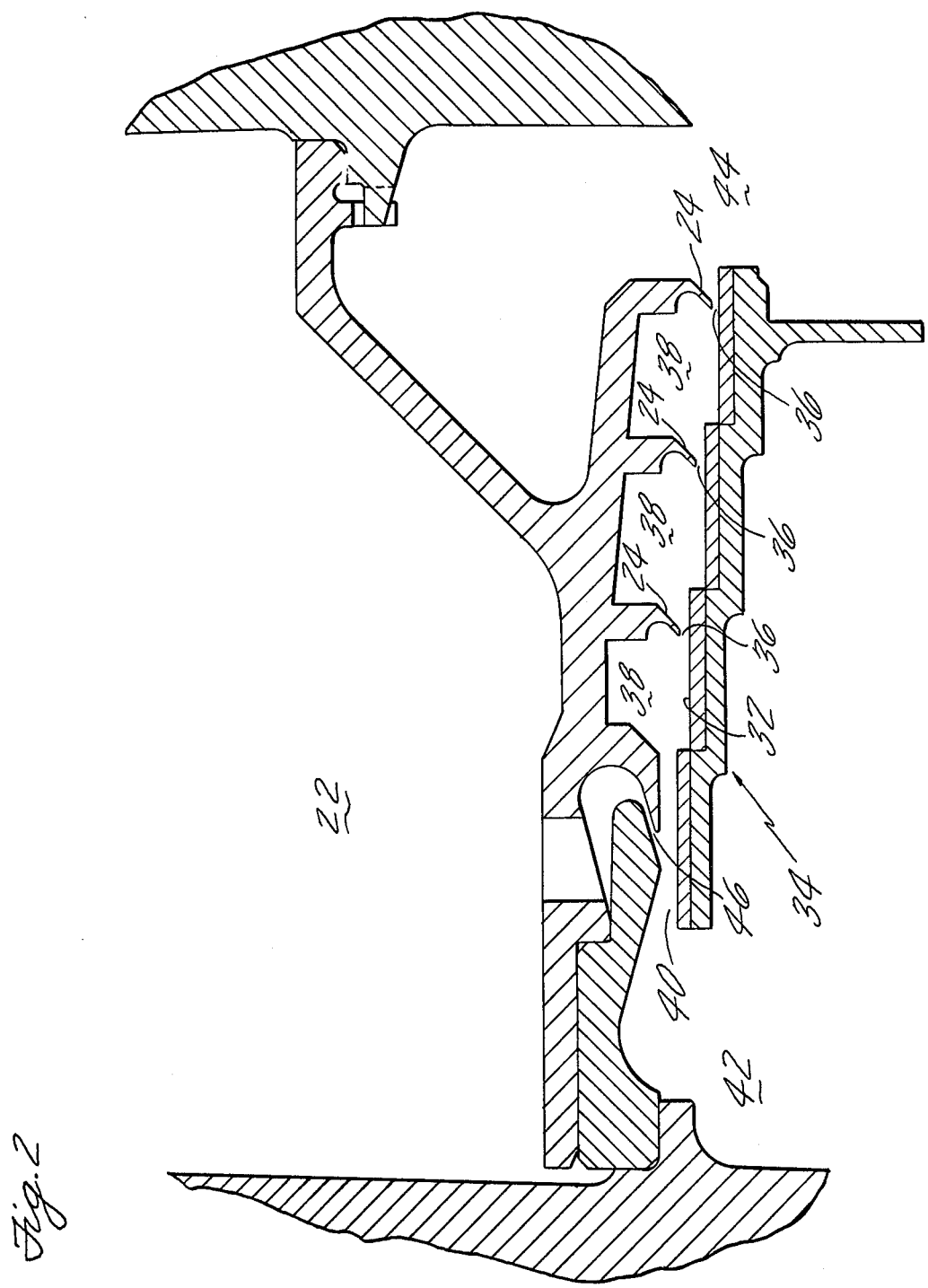
FIG. 2 is an enlarged view of the rotary seal shown in FIG. 1.

As is viewable in FIG. 2 the rings 24 and the surface 32 conjunctively form a labyrinth seal 34 having a series of throttle apertures 36 and expansion chambers 38. An annular channel 40 is formed between the spacer 20 and the shroud 30 at a position immediately upstream of the labyrinth seal. Upstream of the channel is a higher pressure region 42 and downstream of the labyrinth seal is a lower pressure region 44. A nozzle 46, which is in communication with the cavity 22, extends through the spacer 20.

During operation of the engine the pressure of the cooling air in the cavity 22 is higher than the pressure of the working medium fluid in the region 42 upstream of the labyrinth seal 34. Air from the cavity is accelerated across the nozzle 46 to a high velocity and is discharged into the annular channel 40. The kinetic energy of the flowing air propels the air through the channel and into the region 42. The movement of the air through the channel establishes an aerodynamic barrier to the working medium fluid in the higher pressure region 42 which would otherwise flow across the labyrinth seal toward the lower pressure region 44.

The barrier air is accelerated to a high velocity across the nozzle before the air is discharged into the channel. The kinetic energy of the high velocity air resists the natural tendency of the air to flow across the seal to the region 44 of lower pressure. Consequently, only a minimal amount of the barrier air reverses direction and flows downstream into the labyrinth seal.

In the embodiment shown the channel 40 diverges in the direction of the higher pressure region 42. Alternate embodiments contemplated within the scope of the present invention may incorporate a constant area channel, or may even discharge barrier air directly across the upstream end of the labyrinth seal without first flowing the air through a channel. In a preferred construction having a channel, the radial width of the channel is greater than the radial clearance between the restrictive rings 24 and the sealing surface 32. The larger width channel encourages the flow of the barrier air toward the region 42 in preference to flow through the first of the throttle apertures 36.

Figure 3:
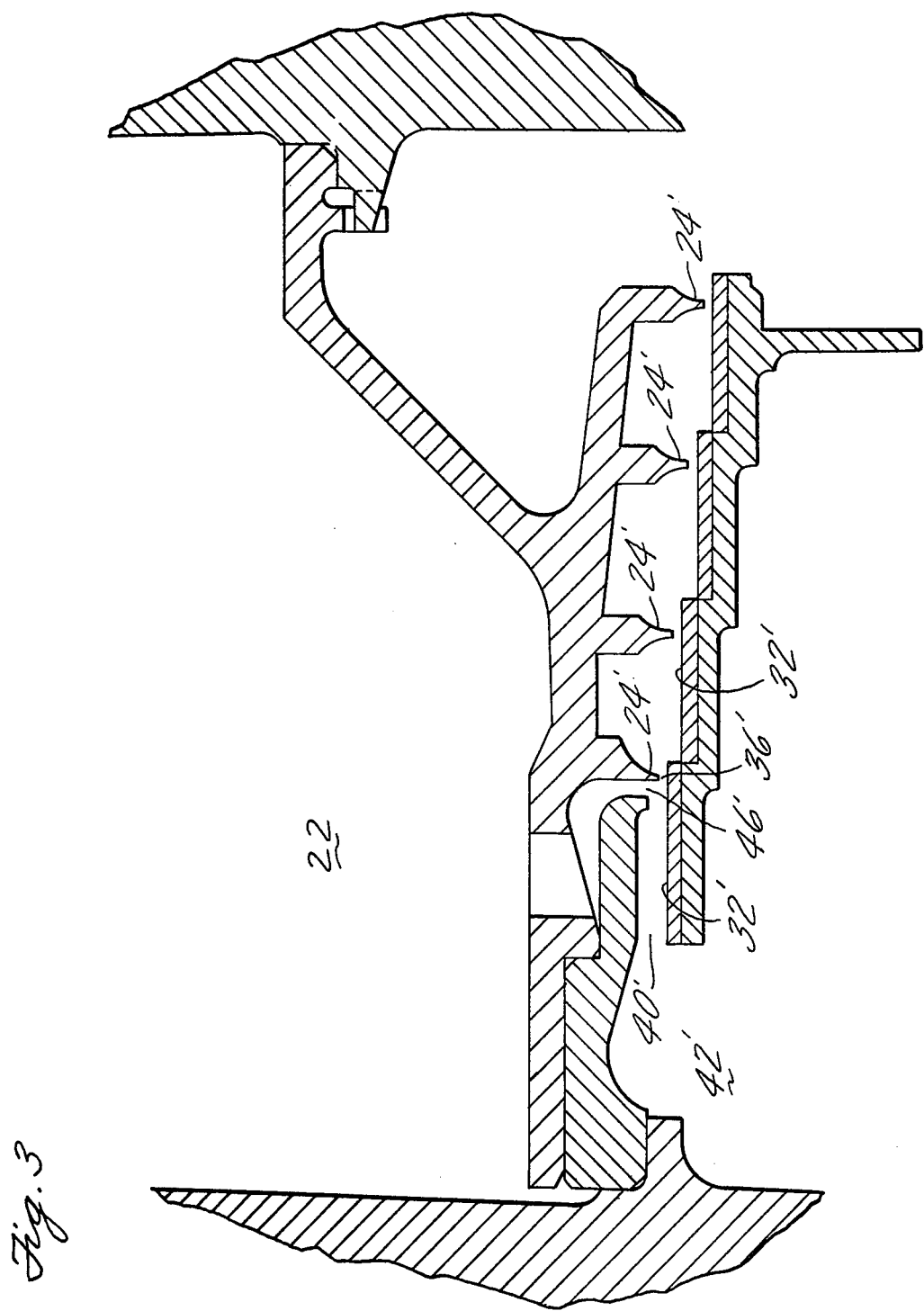
FIG. 3 is an enlarged view of an alternate embodiment of the rotary seal shown in FIG. 1.

In one alternate embodiment which is shown in FIG. 3 the nozzle 46' is oriented perpendicularly to the flow of the fluid medium approaching the first of the throttle apertures 36'. As in the FIG. 2 embodiment, the minimum width of the channel 40' is greater than the radial clearance between the restrictive ring 22' and the sealing surface 32' to encourage barrier air flow toward the region 42' in preference to flow through the aperture 36'.

Although the invention has been shown in combination with a labyrinth seal, the aerodynamic barrier concepts described herein are also effective in combination with other rotary seals. One such rotary seal is known within the art as a "wide channel seal". A wide channel seal is formed of two concentric cylindrical surfaces, one integrally mounted with the rotating component and the other integrally mounted with the stationary component. The surfaces are closely spaced in opposing relationship to restrict the flow of a fluid medium between the two components. In accordance with the present invention the wide channel seal is substitutable for the labyrinth seal shown in FIGS. 2 and 3.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. In combination with a fluid seal between two relatively rotating components of a machine, aerodynamic means for impeding the flow of a fluid medium approaching the seal, comprising:
   an air nozzle mounted on one of the components for directing air which is flowable therethrough during operation of the machine into confronting relationship with the fluid medium approaching the seal; and
   means for supplying air to said nozzle at a pressure greater than the pressure of the fluid medium at the upstream end of the fluid seal.

2. The invention according to claim 1 wherein said fluid seal is a labyrinth seal.

3. The invention according to claim 1 wherein said fluid seal is a wide channel seal.

4. The invention according to claim 1 which further includes, upstream of the fluid seal, a narrow channel formed between the two components in series relationship with the fluid seal, air discharging from said nozzle being directed through the channel in the upstream direction with respect to flow across the fluid seal.

5. The invention according to claim 4 wherein the cross sectional area of said channel diverges in the upstream direction with respect to the direction of flow across the fluid seal.

6. The invention according to claim 4 wherein the minimum cross sectional area of the channel is greater than the minimum area between the two relatively rotating components at the fluid seal.

7. A method for reducing the leakage of a fluid medium across a rotary seal between two relatively rotating components of a machine, comprising the steps of:
   flowing air which is at a pressure greater than the pressure of the fluid medium at the upstream end of the rotary seal to the seal region; and
   discharging the air across the upstream end of the rotary seal in opposition to the flow of the fluid medium approaching the seal to form an aerodynamic barrier impeding the flow of the fluid medium.

8. The invention according to claim 7 wherein the discharged air is directed into a narrow channel upstream of the fluid seal.

9. The invention according to claim 7 wherein the rotary seal is a labyrinth seal.

10. The invention according to claim 7 wherein the rotary seal is a wide channel seal.

11. In combination with a gaseous fluid seal between two relatively rotating components of a gas turbine engine, aerodynamic means for impeding the flow of a gaseous fluid medium approaching the seal, comprising:
   an air nozzle mounted on one of the components for directing air which is flowable therethrough during operation of the machine into confronting relationship with the fluid medium approaching the seal; and means for supplying air to said nozzle at a pressure greater than the pressure of the fluid medium at the upstream end of the fluid seal.

12. A method for reducing the leakage of a gaseous fluid medium across a rotary seal between two relatively rotating components of a gas turbine engine, comprising the steps of:

flowing air which is at a pressure greater than the pressure of the fluid medium at the upstream end of the rotary seal to the seal region; and discharging the air across the upstream end of the rotary seal in opposition to the flow of the fluid medium approaching the seal to form an aerodynamic barrier impeding the flow of the fluid medium.

* * * * *